United States Patent [19]

Hodko

[11] Patent Number: 6,086,739

[45] Date of Patent: Jul. 11, 2000

[54] ELECTROKINETIC REMEDIATION PREFIELD TEST METHODS

[75] Inventor: Dalibor Hodko, College Station, Tex.

[73] Assignee: Lynntech, Inc., College Station, Tex.

[21] Appl. No.: 09/139,993

[22] Filed: Aug. 25, 1998

Related U.S. Application Data

[60] Provisional application No. 60/057,207, Aug. 26, 1997.

[51] Int. Cl.[7] ................................................... C25C 1/22
[52] U.S. Cl. ........................... 204/515; 204/516; 588/204
[58] Field of Search ........................... 588/204; 204/515, 204/516

[56] References Cited

U.S. PATENT DOCUMENTS

| | | |
|---|---|---|
| 2,831,804 | 1/1958 | Collopy . |
| 3,782,465 | 1/1974 | Bell . |
| 4,367,132 | 1/1983 | Bell . |
| 4,382,341 | 5/1983 | Bell . |
| 4,453,594 | 6/1984 | Patten . |
| 4,479,857 | 10/1984 | Barton . |
| 4,495,990 | 1/1985 | Titus . |
| 5,074,986 | 12/1991 | Probstein . |
| 5,137,608 | 8/1992 | Acar . |
| 5,398,756 | 3/1995 | Brodsky . |
| 5,405,509 | 4/1995 | Lomasney . |
| 5,416,257 | 5/1995 | Peters . |
| 5,435,895 | 7/1995 | Lindgren . |
| 5,458,747 | 10/1995 | Marks . |
| 5,476,992 | 12/1995 | Ho . |
| 5,489,370 | 2/1996 | Lomasney . |
| 5,584,980 | 12/1996 | Griffith . |
| 5,616,235 | 4/1997 | Acar . |
| 5,725,752 | 3/1998 | Sunderland . |

FOREIGN PATENT DOCUMENTS

| | | |
|---|---|---|
| 88202274 | 10/1988 | European Pat. Off. . |
| 88202274 | 1/1991 | Netherlands . |

OTHER PUBLICATIONS

Aug. 1992, Sibel Pamukcu.
Nov. 4, 1994, Julie E. Sauer.
Clifford J. Bruell, pp. 68–83 (no date).
Summer 1986, Donald D. Runnells, (no month).
1994, A. Ugaz', p. 183–200 no month.
Nov. 06, 1994, Jeanne Trombly.
May 15, 1994, Fritz G. Will.
Nov. 20, 1993, Earth Science.
1995, Yalcin B. Acar, no month.
Sep. 19–21, 1994, D. Hodko.
Jun. 16–17, 1993, Dalibor Hodko.
Apr. 23, 1993, Ronald F. Probstein.
Sunirmal Banerjee no date.
Sep. 1993, Dalibor Hodko.
Jul. 1986, T. Katan' and P.J. Carlen.
Burton A. Segall, pp. 84–101 (no date).
1993, Yalcin B. Acar, pp. 141–151 (no month).
1992, Akram N. Alshawabkeh (no month).

*Primary Examiner*—Arun S. Phasge
*Attorney, Agent, or Firm*—Streets & Associates; Jeffrey L. Streets

[57] ABSTRACT

Methods for determining the parameters critical in designing an electrokinetic soil remediation process including electrode well spacing, operating current/voltage, electroosmotic flow rate, electrode well wall design, and amount of buffering or neutralizing solution needed in the electrode wells at operating conditions are disclosed These methods are preferably performed prior to initiating a full scale electrokinetic remediation process in order to obtain efficient remediation of the contaminants.

20 Claims, 5 Drawing Sheets

ELECTROKINETIC REMEDIATION PREFIELD TEST METHODS

This application claims benefit of Provisional application Ser. No. 60/057,207 filed Aug. 26, 1997.

This invention was made with government support under contract NAS10-12266 awarded by NASA. The government has certain rights in this invention.

BACKGROUND OF THE INVENTION

1. Field of the Invention

The present invention relates to a method for determining electrode spacing and operating conditions for in situ electrokinetic soil remediation and/or soil treatment.

2. Background of the Related Art

Electrokinetic remediation of contaminated soil is an emerging in situ technology for soil cleanup, which is based on the electrically induced transport of contaminants in soil. An electric field applied between electrodes positioned in the soil induces electrokinetic phenomena in soil including electromigration, electroosmosis and electrophoresis. The electrical transport induced in soil is utilized for controlling the horizontal and/or vertical removal of contaminants from soils of variable hydraulic permeability and moisture content, or the introduction and distribution of reagents into the soil which allow in situ contaminant degradation enhancement of the contaminant solubility, immobilization of contaminants or attainment of an optimum pH in soil during the treatment process. Electrokinetic remediation processes have a number of attractive features including the ability to control the movement of charged, anionic and cationic, as well as non-charged species. Furthermore electrokinetic remediation is able to operate successfully in different soil types, including low hydraulic permeability, clay containing soils. Electrokinetic remediation finds many applications for treatment of soil, such as soils polluted by heavy metals, radionuclides, organic contaminants, or a combination of several pollutants.

Application of an in situ technology for soil cleanup requires knowledge of hydrogeological and the chemical and physical parameters of both the soil and the contaminants at the treatment site. To simplify the design of the electrokinetic remediation process and determine a working amount of chemicals and their concentrations needed for an in situ cleanup process a short bench-scale treatability study is usually performed using contaminated soil from the site. Such treatability studies are well known in bioremediation and in situ soil flushing technologies.

In electrokinetics, data from these types of studies allows the determination of the type and quantity of additives needed to be added to the soil to enhance the electrokinetic remediation process as well as to determine whether the direction of contaminant movement is toward the anode or cathode. However, several operational parameters are strictly dependent on soil conductivity, which is difficult to simulate in a bench-scale experiment due to different packing, porosity of the soil and chemical properties of the pore fluid/soil interface encountered in the field. Thus, not all the design parameters can be accurately determined at the bench scale and used in the scale-up for the electrokinetic remediation process design in the field.

Establishing electroosmotic flow is important in some processes, such as removing organic contaminants and enhancing metal or radionuclide removal from soil. Because the electroosmotic flow depends on the surface properties of soil and the voltage applied between the electrodes, results obtained using only mathematical models or laboratory studies are inconsistent with results obtained in the field. Both the surface properties of soil and the voltage applied between the electrodes are dependent on the voltage or current which can be applied through the soil having particular resistance.

Because the spacing and configuration of the electrode wells directly affects the cost of cleaning the soil as well as the efficiency and uniformity of the soil cleanup, it would be very useful to have a method for determining an efficient or required spacing and configuration of the electrode wells for successful electrokinetic soil processing in the field.

SUMMARY OF THE INVENTION

The present invention provides a method for determining relative positioning for a plurality of working electrodes and a suitable operational current between the working electrodes for efficient in-situ electrokinetic remediation, also referred to herein as a pre-field test. "Efficient" is used herein to mean well spacing, pH, and current values that remediate a site leaving no regions unremediated, in a reasonable amount of time without excessive expense and equipment. What constitutes a reasonable amount of time is dictated by the particular site, environmental, and/or regulatory conditions. The method includes measuring the electric field distribution in a region of soil between a plurality of test electrodes positioned in the soil. A "region of soil" as used herein refers to a portion of the actual site to be remediated. An operational current between the test electrodes is determined as an amount of electrical current that provides a sufficient electric field to drive the electrokinetic remediation without exceeding given soil and well temperatures. A sufficient electric field to drive the electrokinetic remediation is from about 10 Volts/meter to about 300 Volts/meter, preferably between about 50 Volts/meter and about 100 Volts/meter. The electric field in the soil is measured around or in the vicinity of at least one test electrode.

In a preferred embodiment, the pre-field test is carried out using a plurality of test electrodes that are positioned in-situ in a region of soil, where at least one test electrode is an anode and at least one test electrode is a cathode. A plurality of voltage probes are positioned in the soil in a known spaced relationship or array relative to a test electrode and an electric current is applied between the test electrodes. The voltage drop across the soil area is measured by the plurality of voltage probes, which provides information about the voltage distribution across the soil. The electric field is defined as the voltage drop per unit of distance, i.e., the voltage difference between adjacent voltage probes divided by the distance between the two probes. Regions of the soil where the electric field of adjacent test electrodes overlap are determined so that effective distances between working electrodes may be determined.

The working electrodes having opposite charges are positioned so that their respective electric fields overlap, preferably so that the voltage measured at the point where the electric fields overlap is between about 10% and about 20% of the voltage measured near each electrode, such as in the soil adjacent the electrode well wall. However, it should be noted that the electrodes having opposite charges could be positioned at greater or smaller distances depending on how much time the operator has to remediate a given site.

The working electrodes having like charges are positioned so that their electric fields overlap, preferably so that the voltage measured where the electric field lines overlap is between 10% and 20% of the voltage measured near each electrode, such as in the soil adjacent the electrode well wall. The temperature of the soil between the test electrodes, and the temperature of the well can be monitored, perhaps as a function of the applied current. The voltage drop between the voltage probes and an earth ground can be measured or the voltage drop between individual probes can be measured to determine the voltage distribution in the soil. The voltage probes may be positioned in a generally rectangular or circular pattern or coordinate system around each test electrode. The voltage drop may also be measured across a well wall surrounding each of the test electrodes to determine the optimum well wall material for a particular soil condition.

The voltage probes are preferably positioned between the test electrodes and the voltage distribution across the soil is determined based on the voltage drop measured between the voltage probes. Preferably, the three-dimensional voltage distribution in the soil is measured using voltage probes positioned at different depths in the soil region to be remediated.

The volume of fluid in the wells surrounding the cathodes can be measured over time to determine an electroosmotic flow rate through the soil. It may be useful to track electroosmotic flow rate as a function of the voltage applied between the electrodes. In addition, the volume of fluid in the wells surrounding the anodes may be monitored over time.

Preferably, an amount of pH adjusting solution needed per electrode well to efficiently remove contaminants from the soil is determined. One way of determining the amount of pH solution needed by each electrode well is to measure the pH of the soil in an area surrounding the test electrodes, add a solution to the area surrounding the electrodes, and then measure the pH of the soil in the area surrounding the test electrodes. Typically, each test electrode is disposed in an electrode well and the pH adjusting solution may be added to the electrode wells for electrokinetic delivery into the soil. The amount of pH adjusting solution required to reach the desired pH is determined and may be automatically added to the electrode well over time.

Working electrodes having opposite charges are preferably positioned so that there is a sufficient electric field between the working electrodes to drive the electrokinetic remediation. Preferably, an electrode well wall having a higher resistance than the soil, low porosity, and high electroosmotic permeability is provided for a soil region having high porosity, such as sand. Likewise, an electrode well wall having a lower resistance than the soil can be provided for a soil region having low porosity, such as clay.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention describes in situ methods for determining efficient values for each of the parameters that are central to an electrokinetic soil remediation process including electrode well spacing, operating current/voltage, electroosmotic flow rate, electrode well wall design, and the amount of buffering or neutralizing solution needed in the electrode wells at operating conditions. These methods are preferably performed prior to initiating a full scale electrokinetic remediation process in order to obtain efficient remediation of contaminants or other targeted compounds.

One aspect of the invention provides a prefield test for determining the configuration and spacing of an array of electrode wells throughout a contaminated region of soil. This method involves measuring the electric field distribution in the soil between various points throughout the site. The electric field as referred to herein is defined as the voltage drop divided by the distance between two probes. The electric field in the soil may vary throughout the contaminated region due to the non-homogeneous nature of soil. For example, the electric field may be affected by the looseness of the soil, cracks or cavities in the soil, rocks, and other compositional characteristics.

The pre-field test involves: (i) installing several operational test electrode wells; (ii) installing a number of voltage probes in the soil between and around the electrode wells; (iii) applying an electric field between the test electrode wells and determining an operational voltage/current for the electrokinetic remediation process; (iv) determining the electric field distribution in soil between and around the electrodes by measuring the voltage drop between the voltage probes to determine a suitable distance between the electrode wells, (v) determining the electroosmotic flow rate through the soil by measuring the volume changes in the well fluid under an applied electric field, and (vi) determining the volume of neutralizing or buffering solution required by the electrode wells to maintain a certain pH range.

The voltage probes used during the prefield test may be spaced at any known distance, but preferably are equidistant, such as positioning the probes at the corners or vertexes of same size rectangles, preferably having sides measuring about two feet. Then the voltage drop can be easily determined throughout the soil region at each voltage probe, e.g., 2 feet, 4 feet or 6 feet from each well. The electric field distribution reflects the soil and soil pore fluid resistance and provides a map of the voltages surrounding and/or between the electrode wells. By comparing the voltages measured at a particular voltage probe with voltage measurements at the same relative location around other wells, the uniformity of the electric field distribution around each well can be analyzed. Electric field distribution data is useful for sites that have an uneven electric field distribution and allows the operator to design specific electrode wells to compensate for the uneven electric field and provide efficient contaminant removal throughout the site. Additional voltage probe distances may be used if the voltage in the soil is high and easily measurable.

In the example shown below, 12 or 24 Volts was applied between the electrodes spaced 14 feet apart because the soil was highly conductive. In such conductive soil, the current flowing between the electrodes was between about 8 and about 10 Amps, which was considered to be the operational value (described below) for the current per well to run the electrokinetic remediation process. In contrast, 300 Volts was applied to a site with unsaturated soil and high clay content to achieve a current of 4 Amps between electrodes 4 feet apart (approximately 3.5 times shorter distance than in the conductive soil example). The operational current was determined by measuring the temperature of the well after the current was applied until constant well resistive heating was achieved due to the passage of current. (The resistive heating of the well depends on the well solution volume, voltage at the well wall and current applied at the electrode). The current can be increased as long as the well temperature and soil temperature do not exceed certain temperatures. The temperature of the well should not exceed the temperature sustainable by the well casing material (e.g., the well material should not deteriorate in acidic conditions at 40–50° C.). The maximum temperature permitted in the soil between the wells, is typically established by regulators overseeing a particular site. Typically, the highest current per well is one which does not increase the temperature in the wells or soil above about 40–50° C. The electromigration of contaminants increases as the current increases, while the induced electroosmotic flow in soil increases as the voltage increases. Thus, the operational voltage is that voltage where the operational current is achieved. The voltage difference between neighboring voltage probes should be measurable, i.e. at least about 0.1V, depending on the precision of the voltage measurement device. Once the operational current is determined and fixed, the spacing for the electrodes may be determined while operating at the operational current valve. At a minimum, a sufficient electric field between oppositely charged electrodes to drive the electrokinetic remediation is from about 10 Volts/meter to about 300 Volts/meter, preferably between about 50 Volts/meter and about 100 Volts/meter.

In addition to rectangular arrays, any non-rectangular arrangements of the plurality of voltage probes may be used, for example a circular arrangement around each well. In the case of a circular array, the probes are preferably positioned around each electrode well at a common radii, such as about 2 feet, about 4 feet, about 6 feet etc., and preferably spaced radially at lines of approximately equal angles (e.g., 20°, 40°, 60°, 80°, 100°, etc.). If several wells are utilized in the pre-field test, this circular configuration should preferably start from each well separately.

Determining an efficient working electrode well spacing is based on measurements of the electric field surrounding the test electrode wells and the electric field distribution in the soil. The voltage probes may be positioned in various patterns such as: (1) equidistantly (1 or 4 feet) positioned in a rectangular array surrounding an electrode well; (2) located in close proximity (2–4 inches) from the well, and/or (3) positioned (i.e., 1, or 4 feet) between a pair of the electrode wells of different charge.

The array of voltage probes surrounding an electrode well can be used to determine the strength of the electric field surrounding a particular well. The operational voltage, discussed above, is applied to the test electrodes and the voltage drop between the voltage probes is measured. Based on these voltage measurements, the strength of the electric field surrounding each well, referred to as the "region of influence," can be determined. Using this electric field information, the working electrode wells can be positioned at a distance and in such a configuration that provides a suitable overlap between the electric fields between wells having the same or different charge, (e.g., in terms of the length or diameter of the region of influence), where the minimum voltage or electric field is determined as a percentage of the voltage or electric field near the electrode well. If the electric field strength between the two test electrodes is less than about 10% and about 20% of the electric field measured near each respective test electrode, a shorter distance between the wells may be chosen for the working electrodes. However, electrodes of opposite charge may be positioned at any distance, if time is not an issue, so long as some contaminant movement is achieved. The voltage probes are preferably positioned equidistantly to simplify the calculation of the electric field for a given distance.

It is important to determine the distance between the electrodes of same charge for removal of contaminants from the soil between the wells of opposite charge. The ionic current between the anode and cathode in the soil pore fluid depends on the voltage applied in the soil. The farther away the anodes are from the cathodes, the longer it will take for contaminants to reach the electrodes. Generally, depending on the type of ions transported, current and voltage in soil and soil and pore fluid chemistry, the ion transport rate may vary between about 0.5 and about 5 cm/day.

The distance between electrode wells of the same charge can be determined as the distance at which there is a sufficient electric field to affect the transport of the contaminants between the well locations. The value of the electric field measured where the electric field of two wells overlap is preferably greater than about 10% of the electric field measured near the well, so that when the wells are in position, the electric field between the wells will affect the transport of contaminants to the anode and the cathode. A most preferred electric field overlap between adjacent wells is between about 10% and about 30%. Overlaps of greater than about 30% may also be usefull, but they would require a greater number of electrodes which could increase the cost of the system.

The voltage probes positioned in close proximity to the well wall can be used to determine the voltage drop across the electrode well wall, which is a critical parameter in determining the proper design of the electrode well or well wall. For instance, a high voltage drop across the electrode well wall means that a smaller portion of the total voltage is applied across the soil disposed between the electrodes. If the soil surface chemistry is such that the soil can provide high electroosmotic flow (low hydraulic and high electroosmotic coefficients), an electrode well having a high voltage drop will permit very little electroosmotic pumping through the soil because there will not be enough voltage distributed across the soil.

However, there are processes where it is desirable to have a high voltage drop across the well wall, such as when the soil has a high hydraulic permeability (e.g., sandy soil) and it is not feasible to establish an efficient electroosmotic flow through the soil. To enhance the electrokinetic remediation process, the electrode wells can be made of a material with high electroosmotic coefficient, e.g., a ceramic tubing surrounded with different type of packing material, and the high voltage drop across the well wall will provide an efficient electroosmotic pumping at the well wall.

The voltage drop in the soil is obtained from voltage measurements between the voltage probes positioned throughout the soil. The voltage drop across the anode well wall can be calculated as a voltage drop (voltage difference) between the anode voltage minus the voltage at the first voltage probe in soil between the anode and cathode. If the voltage difference between the voltage probes in the soil is divided by the distance between the probes, an electric field strength is obtained in the soil at this specific location. In order to compare the voltage drop at the well wall with the voltage drop in the soil, various voltage readings from the soil can be used. For example, total soil voltage drop can be measured from the voltage probe near the cathode to the voltage probe near the anode. The voltage drop across the well wall can be higher than the total soil voltage by choosing a certain material for the well wall. A high voltage drop at the well wall however, means that most of the voltage applied is "spent" at the well wall. Thus, by using a well wall material, such as ceramic, having a high resistance, low porosity, and high electroosmotic permeability, electroosmosis can be enhanced at the well wall. This is useful in sandy soils where electroosmotic flow is negligible through the soil. The well wall essentially acts as an electroosmotic pump.

A high voltage across the soil means a high driving force for the electrokinetic process, i.e., electroosmosis and electrophoresis, but not electromigration, because electromigration is proportional to the current flowing from the anode to the cathode and electroosmosis and electrophoresis are proportional to the voltage applied. Therefore, in clayey soils, where the voltage drop in the soil is high, the well wall can be made of a material having a lower resistance than the soil, such as a casing with large pores.

As discussed above, multiple voltage probes may be positioned in the soil to monitor the voltage distribution in the soil. A low voltage distribution across the soil can be detected if low voltage drops between spaced voltage probes between the anode and the cathode are present. This information is useful for designing specific wells that match the voltage distribution in the soil to optimize the electrokinetic remediation. For example, if the soil remediation site had a region of low voltage distribution surrounded by a region of high voltage distribution, the electrode wells in the low voltage distribution region could be made of a material having high resistance, low porosity, and high electroosmotic permeability and the electrode wells in the high voltage distribution region could be made of a material having a lower resistance than the soil.

Using the desired well casing and operational voltage/current as determined above, a pre-operation field test can be run at the operational current (and voltage) for a short period of time, preferably a few hours, to determine the amount of the neutralizing or buffering solution required for the cathodes or anodes to maintain the pH in the cathodes or anodes within a certain range. Thus, once the volume of the buffering solution per well is determined, a volume per day can be calculated. Such a pre-operation determination of the volume of acid needed per cathode well or base per anode well can significantly simplify the electrokinetic remediation process by eliminating the need for continuous pH monitoring and control in the electrokinetic remediation process.

Electroosmotic flow (EOF) rate is determined by measuring the accumulation of water in the well over time when the electric field is applied. The electroosmotic flow rate both in the anode well and the cathode well is preferably determined as a function of voltage applied to assist in determining an operational voltage. This in situ measurement of EOF is the most accurate way to determine the direction and rate of water transported electrically in the soil because EOF is dependent on the soil conductivity, concentration of ions in the pore fluid, 4-potential on soil particles, voltage applied through the soil and dielectric and surface properties of soil particles and the pore medium. These parameters are soil and site specific and are not presently as accurately determined or simulated in a bench-top laboratory experiment.

While most soils are negatively charged and support electroosmosis from the anode to the cathode, some soils are positively charged and support electroosmosis from the cathode to the anode. The well casing can be made of different hydraulic or electroosmotic permeability as discussed previously, to enhance the electrokinetic remediation process and control the EOF in soils having different porosities. Use of an appropriate well casing allows for the effective application of electrokinetics in clayey as well as in sandy soils. If different types of well casings are to be included in the prefield test, it is beneficial, but not necessary, to know the type of contaminant in the soil and decide whether the contaminant(s) is (are) to be remediated by electroosmosis, electromigration or some ratio of both.

EXAMPLE

Figure 1:
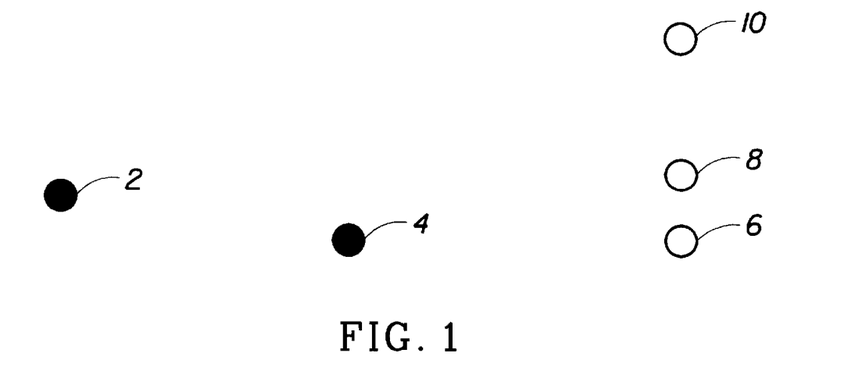
FIG. 1 is a schematic drawing of test electrodes used in the present invention.

A preliminary field test for the determination of the electrode spacing, operating current/voltage and electroosmotic flow was performed at a site located in a tidal marsh with a relatively high water table, about 1.5–2 feet below the soil surface and with highly conductive pore fluid (total dissolved solids about 15,000–20,000 ppm). FIG. 1 is a schematic of five electrode wells (3 inches in diameter) that were installed, including two cathodes and three anodes, down to a depth of 15 feet. The minimum number of electrodes for the pre-field test is three. It should be noted that the polarity of each well could be switched between (+) and (−) depending on what type of electrode is desired. The distance between one pair of anode wells 6, 8 was 4 feet and between another pair of anode wells 8, 10 was 8 feet. The anodes were positioned in a linear row. The distance between the cathode 4 and the anodes was 14 feet and between cathode 2 and anodes was 28 feet. Thus, three distances, 4 feet and 8 feet and 12 feet, were tested between the electrodes of same charge (anodes and anodes) and two distances, 14 feet and 28 feet, between the electrodes of different charge (anodes and cathodes). Additional distances are provided between diagonally positioned electrodes, e.g., cathode 4 and anode 8, cathode 2 and anode 8 or 10. In order not to obstruct the electric field distribution measurement between cathode 2 and anode 6, cathode 4 was positioned slightly below the line between cathode 2 and anode 6.

The anode and cathode wells had different well casings to test for the best anode and cathode well material design. The casings for anode well 6,8, and 10 were made of 4" diameter PVC (polyvinyl chloride) pipe, with horizontal slots about 3 mm wide wrapped with porous polyethylene filt and packed with a mixture of kaolinite (Georgia Kaolinite, RC 32, Crozier-Nelson, Houston, Tex.) and sand (ca 1–2 mm diameter silica sand) of varying percentages. Anode well 6 had a double wall structure. The cathode well 2 and 4 consisted of 3.75" diameter porous ceramic pipe (Ferro Corp., East Rochester, N.Y.) made of a high alumina ceramic material to provide closely controlled pore size, with high flexural strength, low electrical resistivity and low permeability for inducing the electroosmotic flow across the well wall. The surrounding of cathode well 2 and 4 were packed with mixture of kaolinite/sand. Metal electrodes were positioned in the anode and cathode wells filled with the soil pore fluid and provided with a connection to a DC power supply.

The voltage probes used were 10 feet long, 3.4 inches in diameter and were made of stainless steel (SS316 or similar)

coated with a shrinkable TEFLON (polytetrafluoroethylene) tube, available from any electrical supply store. Only the contact portion of the probes, about 1.5 inches at both ends were left exposed. The voltage probes were driven into the soil using an oscillatory hammer to provide the contact portion of the probes at a depth of 5 feet and 7 feet below the soil surface. The two depths allowed the measurement of three-dimensional distribution of the electric field in soil. Such a measurement can reveal any significant deviations in soil resistance caused by debris or soil texture. If significant deviations in soil resistance are found, electrode spacing can be adjusted accordingly to obtain a full coverage by the electric field. In addition, multiple electrodes may be positioned within a single well at different depths to compensate for variations in the soil at different depths. The electrodes could be positioned end-to-end or overlap. The voltage probes were connected to a computer through a National Instruments multiplexer board and an AD/DA converter using 22 AWG wire. The software was written using National Instruments LabView for Windows, provided simultaneous measurements of up to 120 voltage probes. One hundred probes were mounted in the field in between and surrounding the electrode wells.

Operational voltage and current were determined in the field experimentally. By increasing the total applied voltage and measuring the current at each anode and cathode separately. The temperature in the wells was monitored so that it did not exceed the temperature determined by the environmental specifications imposed by the contractor and/or material requirements. Taking the maximum voltage at the desired temperature, an acceptable operational voltage value was determined.

Figure 2:
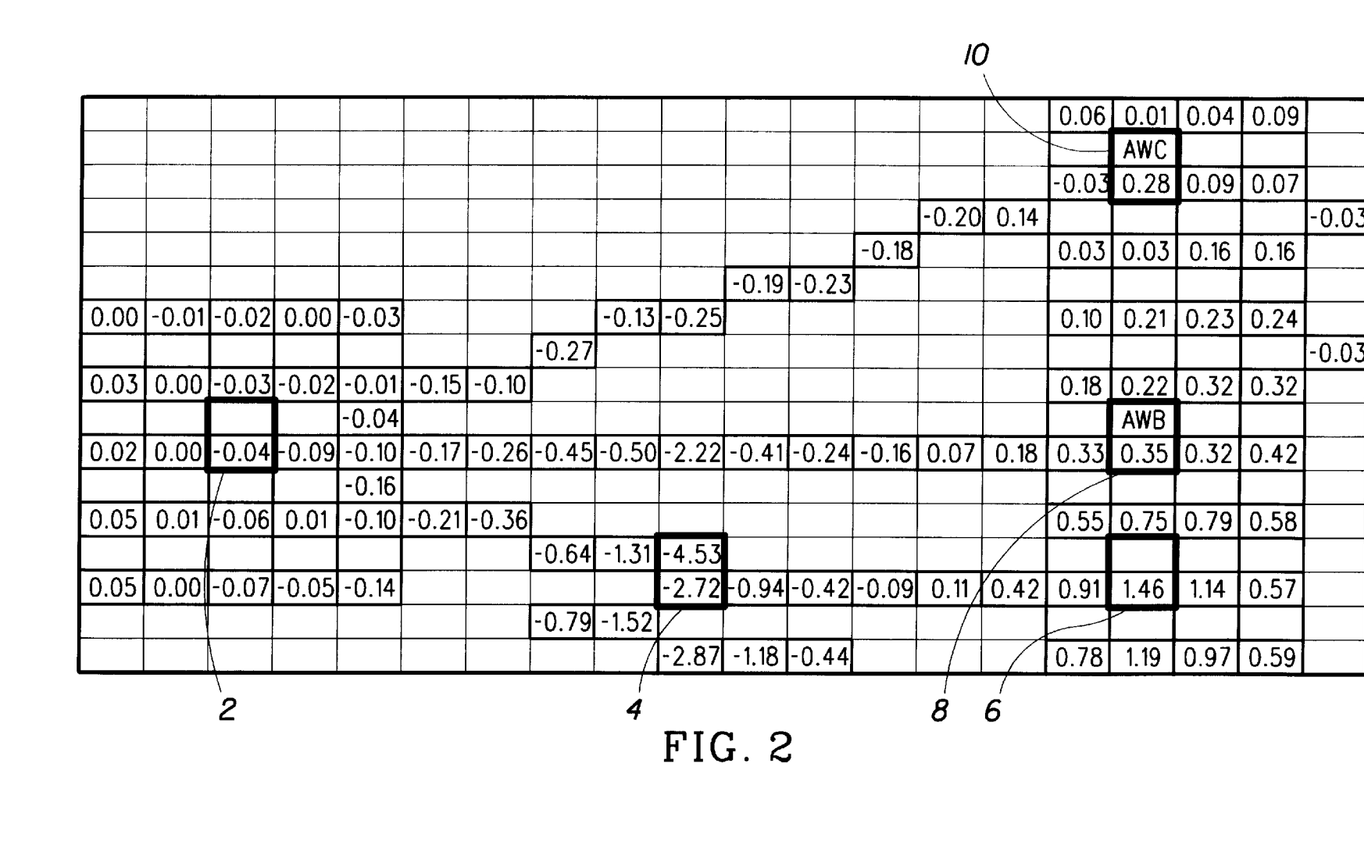
FIG. 2 is a graph of the voltage measurements taken when 12V was applied between cathode 4 and anode 6.

Determining the strength or sphere of influence of the electric field around a particular well was performed by positioning a number of voltage probes at equal spacing surrounding each well. The voltage drop was then measured either between the neighboring probes or relative to earth ground. FIG. 2 shows the voltages measured at voltage probes with respect to earth ground when 12 Volts were applied between cathode 4 and anode 6. Reference earth voltage was measured using 2 probes about 100 feet away from the site, where no electric field influence was measured, i.e., voltage was <0.03V with respect to a grounding rod at a trailer. Anode voltage was +7.47 Volts and cathode voltage was -4.53 Volts (vs. earth ground). Voltage probes surrounding the anode well 6 showed that measurable voltages, significantly above earth ground voltage of 0.03V, were obtained up to 6–7 feet away from the anode well 6 (see voltages in a row vertically fit above the anode well: 0.75V, 0.22V, 0.21V or voltages to the right of the anode 8 (1.14V, 0.67). Also, the voltages to the left (or "behind") the cathode well 4 (-1.31V, -0.64V, -0.36V, -0.21V at 2, 4, 6 and 8 feet from the well) show that the sphere of influence (or electric field distribution) around cathode 4 was about 7–8 feet from the well. This demonstrated that the distance between the electrode wells of the same charge should be between about 6 and about 8 feet.

As shown in FIG. 2, the electric field in the soil at 14 feet from cathode well 4 was still about 3% of the voltage measured near the cathode well 4 (0.04V /1.3V using absolute values), which shows that even at 14 feet the electric field would be effective for the transport of contaminants. Therefore, two electrodes of opposite charge could be positioned 14 feet apart and the spheres of influence would overlap. With regard to the anode well to anode well positioning, a decrease in voltage at anode 6, from 0.35 (1.14–0.79) to 0.09 (0.32–0.23) near the anode 8, where anode 6 and anode 8 are 4 feet apart, represents 28% of the decrease in electric field, providing a high overlap. Therefore, the final recommended distance between anodes was determined to be 6–7. Another way to perform the same analysis is by comparing absolute probe voltages (not differences between the probes) in the line from anode 6 toward anode 8 and 10. The voltage near anode 6 is 1.46 and decreases to 0.75, 0.65, 0.22, 0.21, and 0.03, which corresponds to distances of 2 ft, 4 ft, 6 ft, 8 ft and 10 ft from the anode 6. Thus, these values represent 51% (0.75/1.46), 45%, 15%, 14% and 2% or the voltage measured at the probe near the anode well 6 (2" from the anode casing). This indicates that around 6–7 feet from anode 6 voltage will drop in soil to about 10–15% of the value in soil near the anode. This voltage shows that the region of influence of this anode is strong at the distance of 6–7 feet. Taking into account that the other anodes will have the same diameter region of influence, a good overlap is expected at the distance of 6–7 feet between the anodes.

Figure 3:
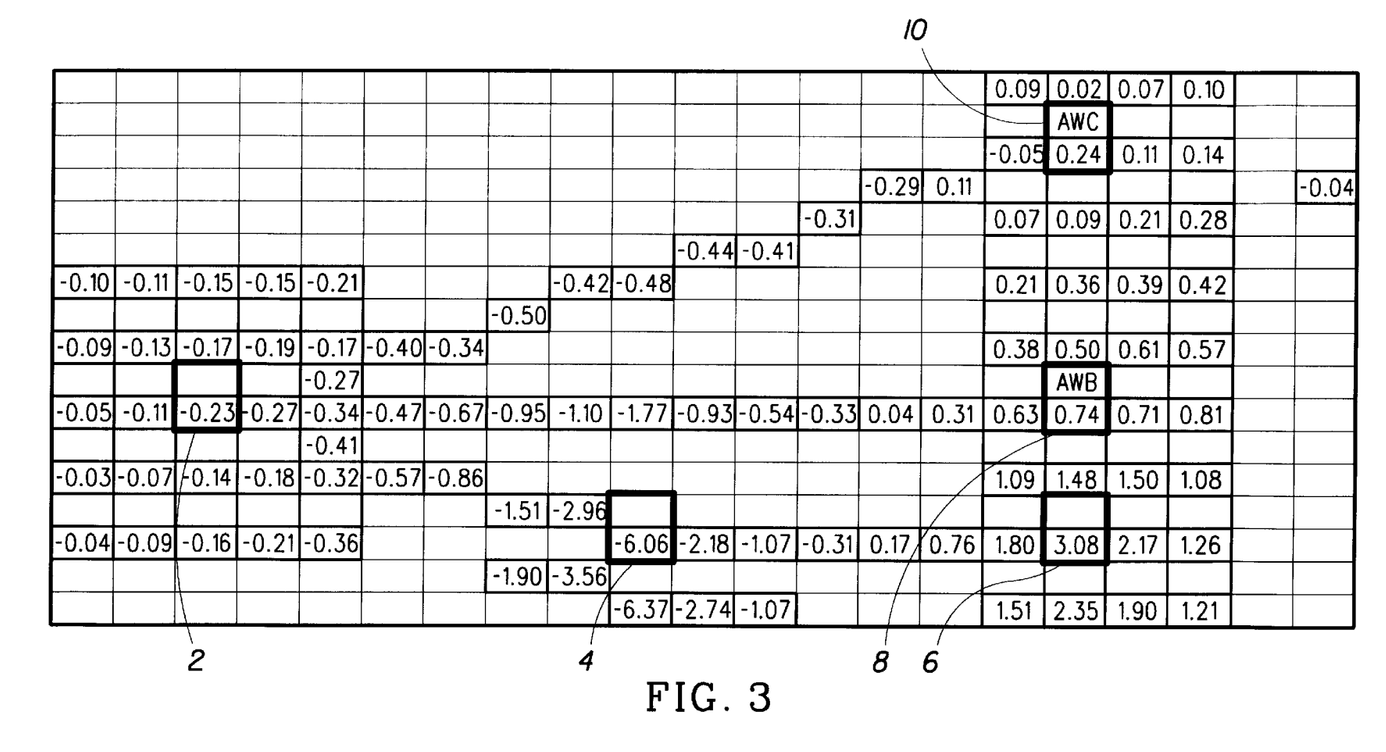
FIG. 3 is a graph of the voltage measurements taken when 24V was applied between cathode 4 and anode 6.

FIG. 3 shows the voltage distribution in the soil when 24V was applied between cathode 4 and anode 6. The voltage measured at the voltage probes at the same locations shown in FIG. 2, approximately doubled compared to 12V experiment, confirming the measurement of the electric field distribution in the soil (by doubling the voltage the electric field at the same locations should double). Therefore, the working distance between the electrodes increases with the increase in voltage. The magnitude of the voltage applied to the soil will depend on the current passed through the wells, i.e., on the power applied through the wells. As stated previously, the optimum voltage applied to the system is one that does not overheat the soil or the wells. The current measured in the wells was about 7–8 A (for 24V applied), and the power introduced through the electrodes to the soil did not affect the wells or soil temperature. No resistive heating occurred in the wells because of very high conductivity of the soil pore fluid.

FIG. 3 also shows the voltages to the left of the cathode well 4 (-2.96, -1.51, -0.86) when an electric field was applied between cathode well 4 and anode well 6. The voltage in the soil decreased with distance starting from a particular well. Voltage values with respect to the earth ground were: -2.95, -1.51, -0.86, -0.57, -0.32, -0.18, etc., The difference between the neighboring voltages, e.g., 2.95–1.51=1.45 (absolute values were taken), are as follows: 1.45, 0.65, 0.71, 0.29, 0.25, 0.14, 0.04. These voltage differences represent the electric field distribution in soil because the distances between the voltage probes are the same, i.e., 2 ft (electric field=voltage difference/distance). Thus, the electric field decreased away from the well. It is important that there is enough electric field in soil within a particular soil section to drive the contaminants to the anode or cathode and eventually out of the soil. The electric field is weaker for each 2 foot section or measured area further away from the well. Preferably, the electric field at the edge of each sphere of influence is approximately 10% to 20% of the electric field measured near the well, so that when the spheres of influence overlap, the electric field will affect the transport of contaminants to the anode and the cathode.

Figure 4:
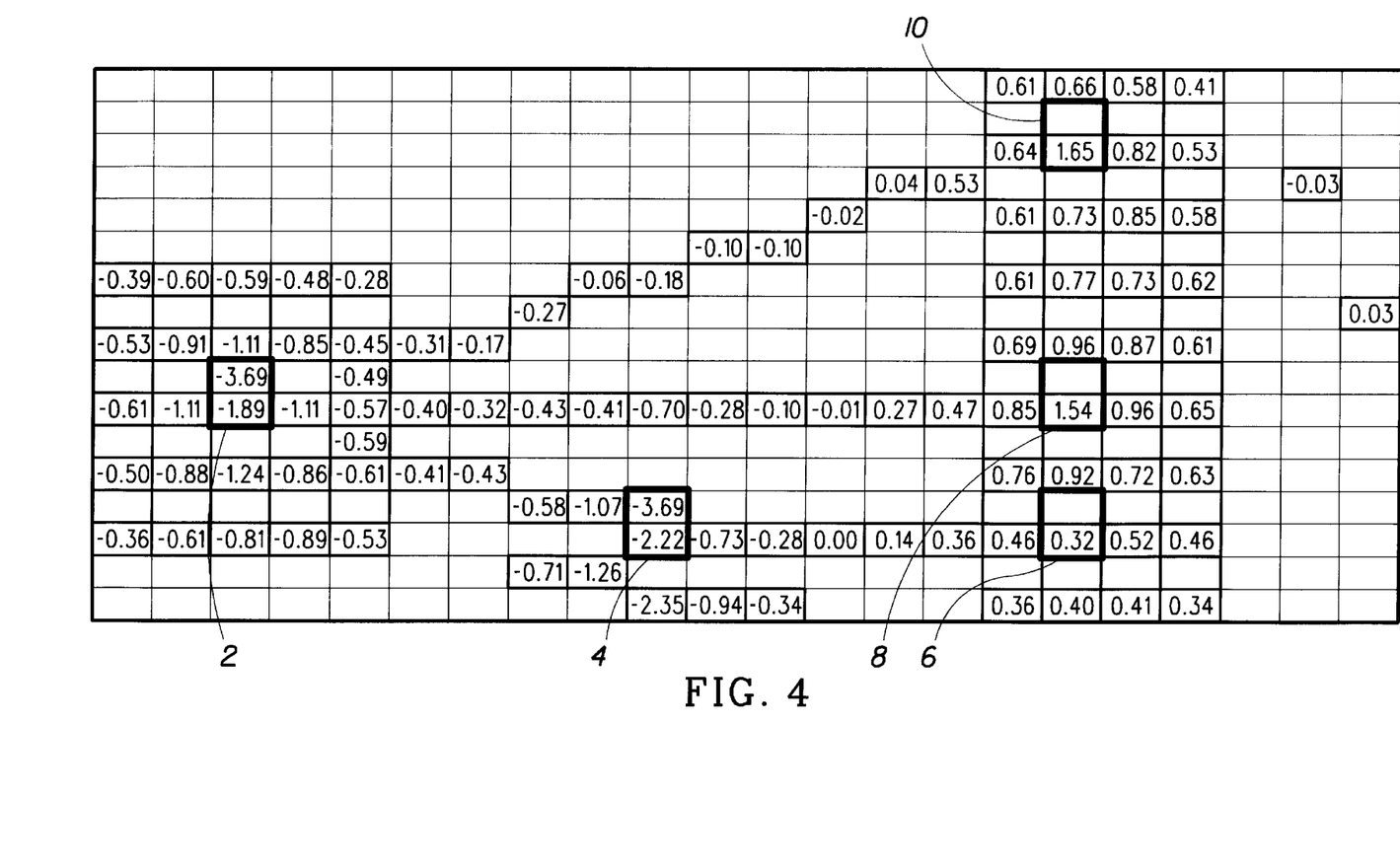
FIG. 4 is a graph of the voltage measurements taken when current was applied between cathodes 2 and 4 and anodes 8 and 10.

FIG. 4 shows measurements of the electric field distribution when four electrode wells were connected in the electrokinetic remediation process operation: cathodes 2 and 4 and anodes 8 and 10 (anode well 6 was not connected to the power supply in this experiment). Electric field lines were measured using voltage probes positioned equidistant at 2 feet between the cathode well 2 and anodes 8 and 10 along the lines of strongest electric field intensity determined from the measurements taken above. The electric field line distribution in soil resembles that of the magnetic field lines between two magnetic poles. The magnetic field is strongest in the direction between the two poles and decreases to the left and right (and behind) the poles. This analogy can be applied to two electrode wells in soil. The lines of strongest electric field intensity (highest current flowing) is the shortest straight line between the two wells. When 12V was applied between cathode wells 2 and 4 and anode wells 8 and 10, a clear voltage gradient was established from the cathodes −3.69, relative to the earth ground, to the anodes +8.31.

A corresponding change in voltage drop between the voltage probes can be followed throughout the soil. The voltages at the voltage probes surrounding the cathode 2 indicate a clear decrease in voltage with distance from the well. It is noteworthy that approximately the same decrease in voltage is observed at equivalent distances (or circumferences) from the cathode. Thus, the points "behind" or to the left of the cathode well 2 in the corners of the highlighted rectangle had very similar values, −0.39V and −0.36V. Also, neighboring probes along the same line showed comparable voltages, −0.53V and −0.50V. This confirmed that we were measuring the sphere or region of influence around the electrode well, which confirmed a spherical distribution of the electric field lines around the well with radius of more than 4 feet. The results also demonstrated that the electrokinetic process can affect the soil outside the field or physical location of the electrodes. In the electrokinetic remediation process the contaminants are pulled toward the treatment zone, which is defined as the area between the electrodes, and contained within the treatment zone by the electric field between the electrodes.

Voltages measured between the anode well 8 and 10 (See FIG. 4) demonstrate that the electric field lines, or spheres of influence from each well, clearly overlapped and that the larger distance of 8 feet between the anodes compared to 4 feet distance between anode 6 to anode 8 could be used as the operating distance between the anodes in this field process.

Figure 5:
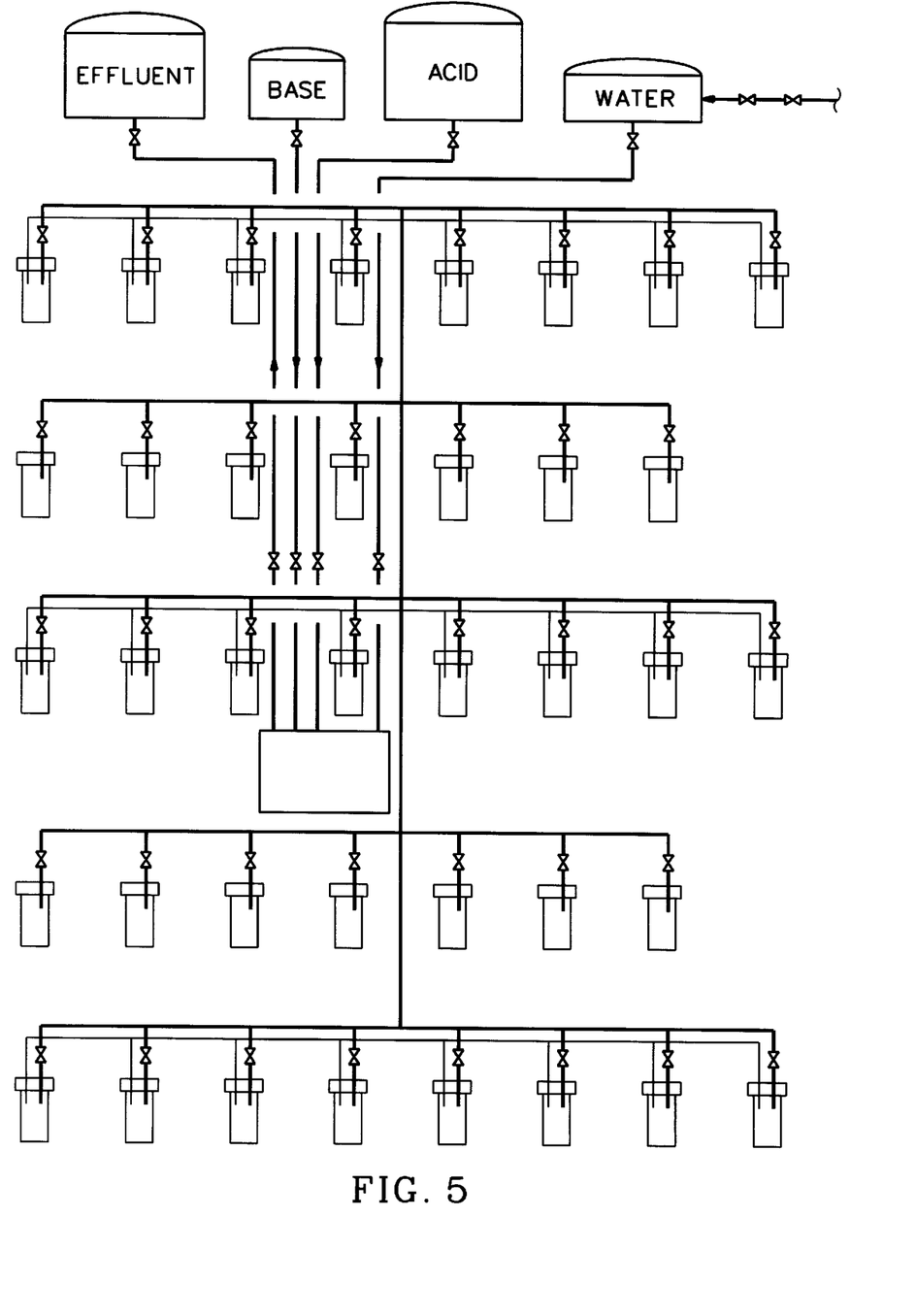
FIG. 5 is a schematic view of the electric field around an anode and a cathode.

FIG. 5 is a schematic representation of electric field lines around an anode 12 and a cathode 14. The electric field lines 16 and 18 overlap at point X where the value of the electric field is about 10% of the electric field measured near each electrode.

An efficient pH value foe electrokinetic remediation depends on the soil buffering capacity which can be determined in bench-scale soil titration tests. It is desirable to run as low pH as allowed by environmental and regulatory conditions, because highly acidified soil will easily release metals from soil. With regard to the site used in the Example, the project managers required that the soil pH not be lower than 2.5, during the process. As a result of the electrochemical reactions taking place in the anode wells, an acid having a pH of about 1–2 is formed and transported into soil. If the soil pH goes below 2.5 a basic solution may be added to the anodes to increase the pH to about 4 and prevent further acidification of the soil. However, from past experience, base addition to the anode well was not necessary, because electrochemically formed acid was never strong enough to overcome the soil buffering capacity and acidify the soil below pH 2.5–3.0. Therefore, the electrokinetic remediation process was typically run with no control of pH at the anodes. In the cathodes, the electrochemically produced base can be neutralized or acidified by addition of citric acid. Citric acid provides citrates which migrate into the soil and act as complexing agents for metals in soil which enhances the electrokinetic remediation process. Citric acid is highly soluble, so that a 20% acid solution may be prepared, which yields a pH of about 1.4–1.6. This acid solution is added to the cathode wells. The amount of acid solution added depends on the current according to Faraday's law (number of moles of water electrolyzed=(current (A)×time (s))/(2 * 96500). Where 2 is the number of electrons in the reaction, and 96500 is the number of coulombs needed for electrolyzing one mole. The addition of acid is controlled by a pH controller which measures the pH in the cathode wells and adds acid to the wells as needed. In the Example, the pH of the cathode wells was maintained between 3–5. These tests determine the consumption of pH adjusting additives needed to operate the process in the field.

After establishing the distance between electrode wells, the electroosmotic flow was determined as a function of the voltage applied. The electroosmotic flow (EOF) was determined by measuring the fluid volume change in a cathode over time. There were two level sensors in the cathodes, a high level sensor and a low level sensor. When the water level rose in the cathode due to EOF and the high level sensor was reached, the high level sensor sent a signal to the computer to turn on the pump and open the valve for pumping the liquid out of the well until the low level sensor was reached. We precalibrated the pump flow rate, and by measuring the time it took for the water level in the cathode to go from the low level sensor to the high level sensor, we determined the volume of the water originating from the electroosmotic flow (volume=flow rate–time). Each time the pump took the water out of the well, the volume was summed with the previous reading and integrated. Therefore, we could calculate the total EOF volume accumulated over long periods of time. The time the pump and valve are opened can be determined in two ways: 1) the pump is turned on until the water level reaches the low level sensor so that the same volume is taken out of the well each time; or 2) the pump may be turned on for a predetermined amount of time manually entered by the user.

Several observations were made from the data collected in the preliminary field test. The soil pore fluid exhibited a very high conductivity. At distances up to 28 feet between the electrode wells positioned in the soil, the voltage to achieve 8 A in the wells was about 24V. This yielded a resistance of only 3 ohms. The measurement performed at the bench scale in soil beds, using soil and pore fluid from the site, showed over one order of magnitude higher resistance. This value is clearly not representative of the field situation. The low soil resistance is due to high chloride concentration in the brackish water at the site. In these conditions, it is expected that the total power consumption for the electrokinetic remediation process will be significantly lower than for instance in low moisture content, clayey soils.

Due to the high conductivity of the soil pore fluid, no significant effect on the voltage was found if the distance between the electrode wells was doubled and the current kept constant. This indicated that the distance between the anode and cathode wells could be very large, up to 28 feet. However, because of the generally observed electromigration transport rates of metals in soil (about 0.5–2 cm/day) and the fixed duration of the electrokinetic remediation process required by the contractor, the efficient distance between the electrode wells of different charge (i.e., anodes and cathodes) was determined to be 14 feet.

One-hundred voltage probes positioned between the electrode wells allowed an accurate measurement of voltage distribution in the soil. From the voltage distribution around the wells, a sphere of electrical field influence for each well was monitored at two different voltages (12V and 24V) and at two different depths (3 feet and 7 feet). These tests clearly demonstrated that the radius of the influence around each well was 7–8 feet From these data, a safe distance between the anode wells where the electric field lines are strongly overlapping, was determined to be 6.5 feet. Because of high conductivity of the pore fluid, only slight increases in voltages were observed when the voltage probes were positioned at a depth of 7 feet. This indicated a uniform distribution of the electric field at the soil surface and deep in the soil.

Figure 6:
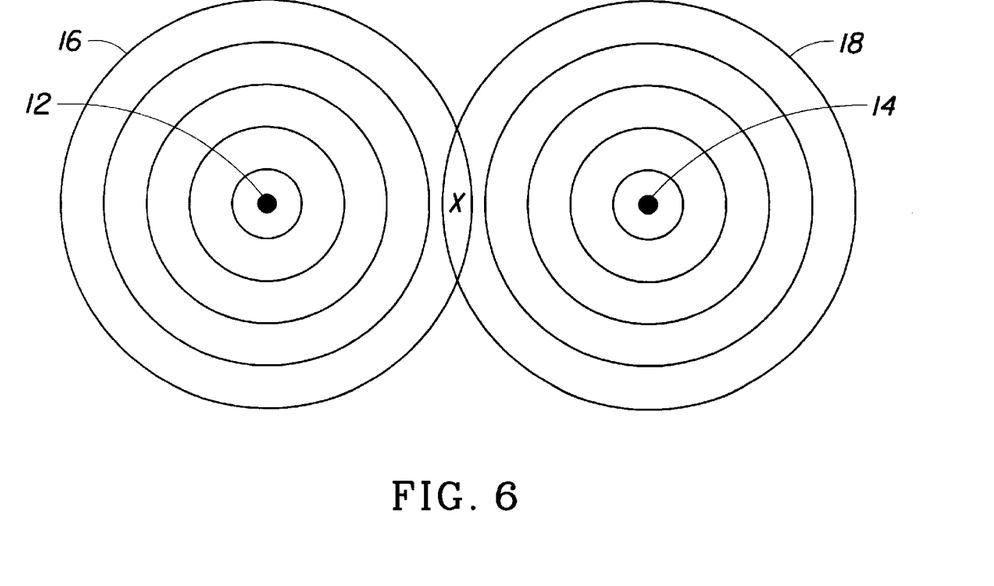
FIG. 6 is a schematic representation of the electrode array based on the results of the pre-field test.

FIG. 6 is a schematic representation of the electrode array generated from the field determined efficient distances between the electrode wells. The site was 45 feet wide and 60 feet long, thirty two anodes and fourteen cathodes were installed. The distance between the wells of the same charge was 6.5 ft and between anode and cathodes 14 ft. A non-uniform electric field was intentionally established where one cathode was surrounded by four anodes. We have found that when a nonuniform electric field is established in the soil, up to a 10–30% increase in contaminant removal from soil can be achieved.

The electroosmotic flow from the anode wells was very low because the wells were designed using a casing that provided low electroosmotic flow while containing the solution in the well casing. This configuration helped in removal of negatively charged chromium contaminant present in soil, which typically concentrates in the anodes during the electrokinetic remediation process. The electroosmotic flow in the cathode wells, made of ceramic tubing, was about 0.1 L per well during the test (1.5 h). This yields about 20 L/day (5.3 gal) from 14 cathode wells. These values were used to determine the size of the fluid management system and effluent containers.

While the foregoing is directed to the preferred embodiment of the present invention, other and further embodiments of the invention may be devised without departing from the basic scope thereof, and the scope thereof is determined by the claims which follow.

What is claimed is:

1. A method for determining an efficient positioning for a plurality of working electrodes and an efficient current between the working electrodes for in-situ electrokinetic remediation comprising:

measuring the electric field distribution in an area of soil between a plurality of test electrodes positioned in the soil; and determining an operational current between the test electrodes that provides an electric field to drive the electrokinetic remediation below a given well temperature.

2. The method of claim 1, further comprising the steps of:

positioning the plurality of test electrodes in-situ in an area of soil, wherein at least one test electrode is an anode and at least one test electrode is a cathode;

positioning a plurality of voltage probes in the soil in an equidistant spaced relationship to each electrode;

applying voltage between the test electrodes;

measuring the voltage drop across the soil area; and determining soil positions where the electric fields of the test electrodes overlap.

3. The method of claim 1, further comprising the step of:

determining soil positions for the working electrodes having opposite charges so that their respective electric fields overlap, such that the electric field measured where the electric fields overlap is between 5% and 20% of the electric field measured near each electrode.

4. The method of claim 1, further comprising the step of:

determining the soil positions for the working electrodes having like charges so that their respective electric fields overlap, such that the electric field measured where the fields overlap is between 10% and 20% of the electric field measured near each electrode.

5. The method of claim 1, further comprising the step of:

monitoring the temperature of the soil between the test electrodes.

6. The method of claim 1, further comprising the step of:

measuring the voltage drop between the voltage probes and an earth ground.

7. The method of claim 1, further comprising the step of:

positioning the voltage probes in a generally rectangular array around each test electrode.

8. The method of claim 1, further comprising the step of:

positioning the voltage probes in a generally circular array around each test electrode.

9. The method of claim 1, further comprising the step of:

measuring the voltage drop across a well wall surrounding each of the test electrodes.

10. The method of claim 1, further comprising the steps of:

positioning the voltage probes between test electrodes having opposing charges;

measuring the voltage drop between the probes; and determining the voltage distribution across the soil based on the voltage drop between the voltage probes.

11. The method of claim 10, further comprising the steps of:

positioning the voltage probes at different depths in the soil; and measuring the voltage distribution at different depths in the soil.

12. The method of claim 1, further comprising the steps of:

monitoring a fluid volume surrounding the cathodes over time;

determining an electroosmotic flow rate through the soil based on the change in fluid volume surrounding the cathodes over time.

13. The method of claim 1, further comprising the step of:

monitoring the fluid volume surrounding the anodes over time.

14. The method of claim 1, further comprising the step of:

determining a minimum amount of pH adjusting solution needed per electrode well to maintain a desired pH in the soil.

15. The method of claim 14, further comprising the steps of:

measuring the pH of the soil near the test electrodes; and adding a pH adjusting solution to an area surrounding the electrodes to adjust the pH to a desired value; and measuring the pH of the soil in the near the test electrodes after the pH adjusting solution addition.

16. The method of claim 14, wherein each test electrode is disposed in an electrode well and the pH adjusting solution is added to the electrode wells.

17. The method of claim 1, further comprising the step of:

positioning the working electrodes having opposite charges so that the electric field surrounding a first electrode overlaps with the electric field surrounding a second electrode.

18. The method of claim 1, further comprising the step of:
providing an electrode well wall having a greater electrical resistance than the electrical resistance of the soil, a lower porosity than the porosity of the soil, and high electroosmotic permeability.

19. The method of claim 1, further comprising the steps of:
providing an electrode well wall having a lower electrical resistance than the electrical resistance of the soil.

20. A method for electrokinetic remediation of a region of soil comprising:
installing in a minor portion of the region of soil a first array of electrode wells comprising at least two anodes and at least two cathodes, the array defining a plurality of spaced relationships selected from anode-cathode distances, anode-anode distances, cathode-cathode distances, or combinations thereof;

operating a plurality of electrode combinations in the first array of electrode wells at an operational voltage;

measuring the electric field strength in and around the first array during operation; and installing in a major portion of the region of soil a second array of electrode wells to provide and electric field across at all points in the major portion of the region of soil that is greater than about 10% of the electric field measured at each well.

* * * * *